(12) United States Patent
Mastrobattista

(10) Patent No.: US 7,587,838 B2
(45) Date of Patent: Sep. 15, 2009

(54) FRAMING RAFTER SQUARE ATTACHMENT

(76) Inventor: Michael Mastrobattista, 10035 Carrol Canyon Rd., Suite C, San Diego, CA (US) 92131

( * ) Notice: Subject to any disclaimer, the term of this patent is extended or adjusted under 35 U.S.C. 154(b) by 20 days.

(21) Appl. No.: 12/024,085

(22) Filed: Jan. 31, 2008

(65) Prior Publication Data

US 2008/0289206 A1 Nov. 27, 2008

Related U.S. Application Data

(60) Provisional application No. 60/898,862, filed on Jan. 31, 2007.

(51) Int. Cl.
*B23Q 17/22* (2006.01)
(52) U.S. Cl. .......................... 33/640; 33/427
(58) Field of Classification Search .................. 33/427, 33/428, 429, 630, 640; 83/468.4, 485, 574, 83/743, 745
See application file for complete search history.

(56) References Cited

U.S. PATENT DOCUMENTS

| | | | | |
|---|---|---|---|---|
| 4,281,572 A * | 8/1981 | Stovall | .......................... | 83/745 |
| 4,936,176 A * | 6/1990 | Silverman | .................... | 33/427 |
| 5,148,730 A * | 9/1992 | McCaw | ........................ | 83/745 |
| 5,813,126 A * | 9/1998 | Dahl | ............................ | 33/427 |
| 5,983,767 A * | 11/1999 | DeFelice et al. | .............. | 83/745 |
| 6,604,296 B2 * | 8/2003 | Mastrobattista | .............. | 33/640 |
| 7,063,000 B2 * | 6/2006 | Molburg | ....................... | 83/745 |
| 2001/0034951 A1 * | 11/2001 | Sears | .......................... | 33/640 |
| 2006/0283033 A1 * | 12/2006 | Peterson | ...................... | 33/429 |

\* cited by examiner

*Primary Examiner*—G. Bradley Bennett
(74) *Attorney, Agent, or Firm*—Steins & Associates, P.C.

(57) ABSTRACT

A Framing Rafter Square Attachment. The attachment cooperates with a conventional rafter or framing square to make the repetitive cutting of lengths of framing lumber (such as for blocking) much easier and faster to accomplish. The attachment allows the position of the framing square as held by the attachment to be adjustable so that it can accommodate a wide variety of circular saw fence configuration. The attachment is extendable and retractable so that the attachment has both a compact size for storage, while at the same time being able to accommodate longer cuts. A drag clip may be provided to allow the user to selectively pinch a piece of wood with the attachment so that the pinched piece of wood can then be repositioned for another cut without the user having to set down either the circular saw or the attachment. Finally, the attachment has a subassembly that allows the user to easily cut a piece of lumber to fit a preexisting length or opening.

20 Claims, 9 Drawing Sheets

FRAMING RAFTER SQUARE ATTACHMENT

This application is filed within one year of, and claims priority to Provisional Application Ser. No. 60/898,862, filed Jan. 31, 2007.

BACKGROUND OF THE INVENTION

1. Field of the Invention

This invention relates generally to wood working tools and fixtures and, more specifically, to a Framing Rafter Square Attachment.

2. Description of Related Art

The invention that is the subject of the present application is an advancement of that invention described in U.S. Pat. No. 6,604,296, issued Aug. 12, 2003, by the same inventor.

The product known as a "Speed Square™" is in wide use by virtually every professional framer (individuals whose expertise is in constructing structures from wood framing material). An example of the conventional Speedsquare™ attached to the attachment of the present invention is shown in FIG. 1 and labeled as item 110 therein. The Speed Square™ 110 is designed to be used to permit a framer to rapidly make precise cuts (typically cross-cuts) in framing material using a conventional electric handheld circular saw. The conventional use of a Speed Square™ 110 is well-disclosed in the '296 patent, and therefore will not be repeated herein.

While the device of the '296 is a great advancement beyond the prior art of the time, there were a few advancements that have been discovered since the creation of that device. First, the board feeding mechanism/assembly needed additional thickness resolution so that it could accommodate limitless thickness of boards within the range of boards typically used for blocking. Next, a side boundary for the boards being fed was needed in order to further stabilize boards while they were being fed. Third, refinement of the extension member and locking device mechanism was appropriate. Fourth, it was determined that a "cut to fit" option would be desirable so that the worker could cut precise blocking to custom framing bays. Finally, the entire attachment assembly of the '296 attachment need to be revised so that high volume production could be attained.

SUMMARY OF THE INVENTION

In light of the aforementioned problems associated with the prior devices, it is an object of the present invention to provide a Framing Rafter Square Attachment. The attachment should work with a conventional rafter or framing square to make the repetitive cutting of lengths of framing lumber (such as for blocking) much easier and faster to accomplish. The attachment should allow the position of the framing square to be adjustable so that can accommodate a wide variety of circular saw fence configurations. The attachment should further be extendable and/or retractable so that the attachment has both a compact size for storage, while at the same time being able to accommodate longer cuts. A drag clip should be provided to allow the user to selectively pinch a piece of wood with the attachment so that the pinched piece of wood can then be repositioned for another cut without the user having to set down either the circular saw or the attachment. Finally, the attachment should provide a subassembly that allows the user to easily cut a piece of lumber to fit a preexisting length or opening.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Framing Rafter Square Attachment.

Figure 1:
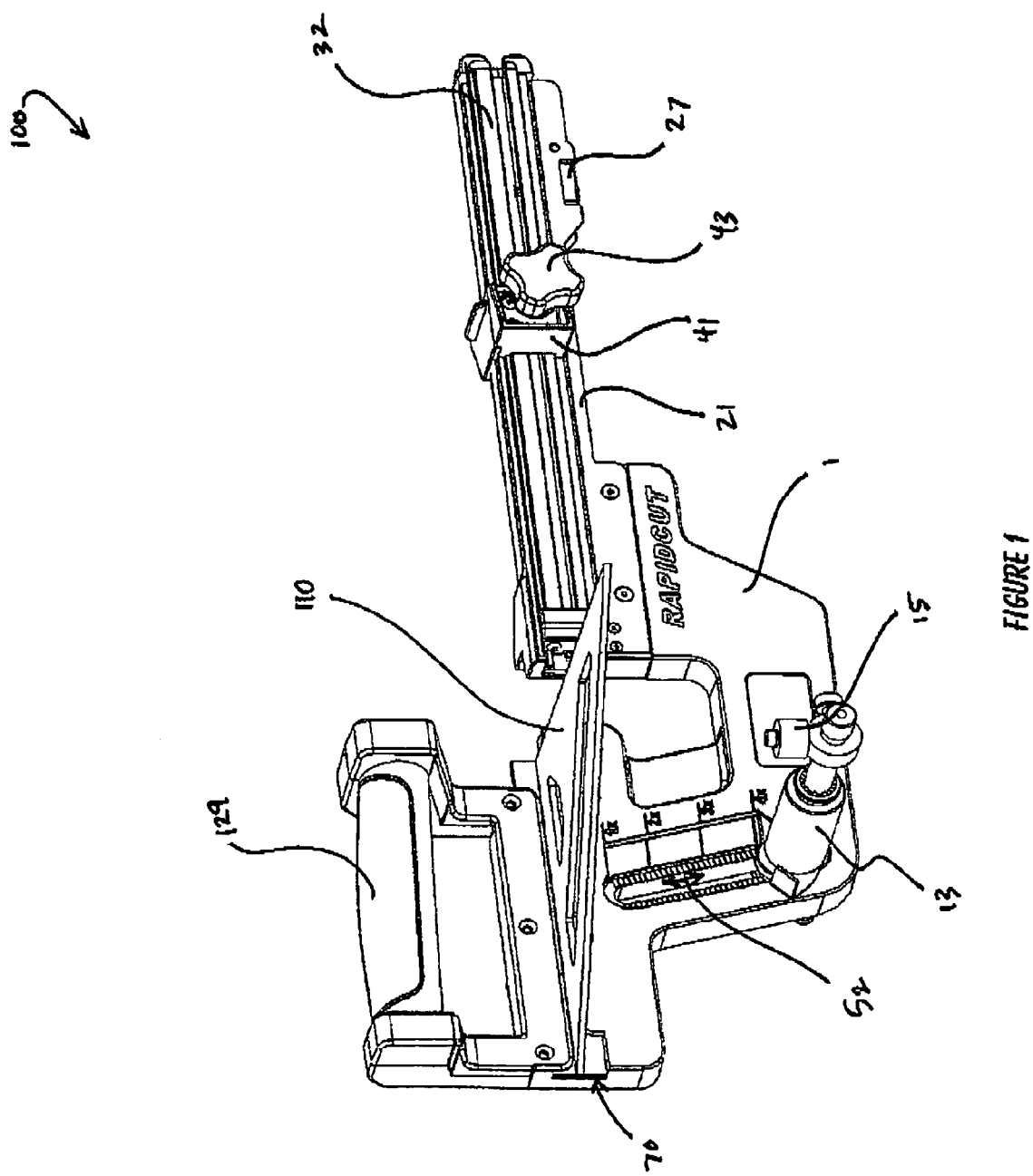
FIG. 1 is a front perspective view of the framing rafter square attachment of the present invention.

The present invention can best be understood by initial consideration of FIG. 1. FIG. 1 is a front perspective view of the framing rafter square attachment 100 of the present invention. The Framing Rafter Square Attachment 100 of the present design has three main parts: the main frame 1 (also referred to as the main frame assembly), the second retaining channel 21, and the extension bar 32. The framing square 110 slides into and is adjustable along the first retaining channel 70 that is positioned longitudinally in the main frame 1. This allows the framing square 110 to be slid along the length of the main frame until it is at a zero point on the measurement scale which can be seen more clearly in FIG. 3. Zeroing the framing square 110 refers to adjusting the square's positioning along the first retaining channel 70 to cooperate with the particular circular saw being used to take into account the specific fence dimensions of the saw, such that when a cut is made using the attachment 100 with the saw's fence against the square 110, the cut will be at "zero" on the measuring scale.

One substantial improvement of this new design is that the peg 123 of the prior design has been replaced with an assembly that is adjustable for different thicknesses of wood. Instead of a peg there is now a roller sleeve 13 extending outwardly from the main frame 1 that is adjustable up and down along the support roller slot 52. Also, a side roller sleeve 15 extends upwardly from the end of the roller sleeve 13 to provide an additional side restraint to the wood when the user is feeding pieces of wood into the attachment 100 for the next cut.

Figure 2:
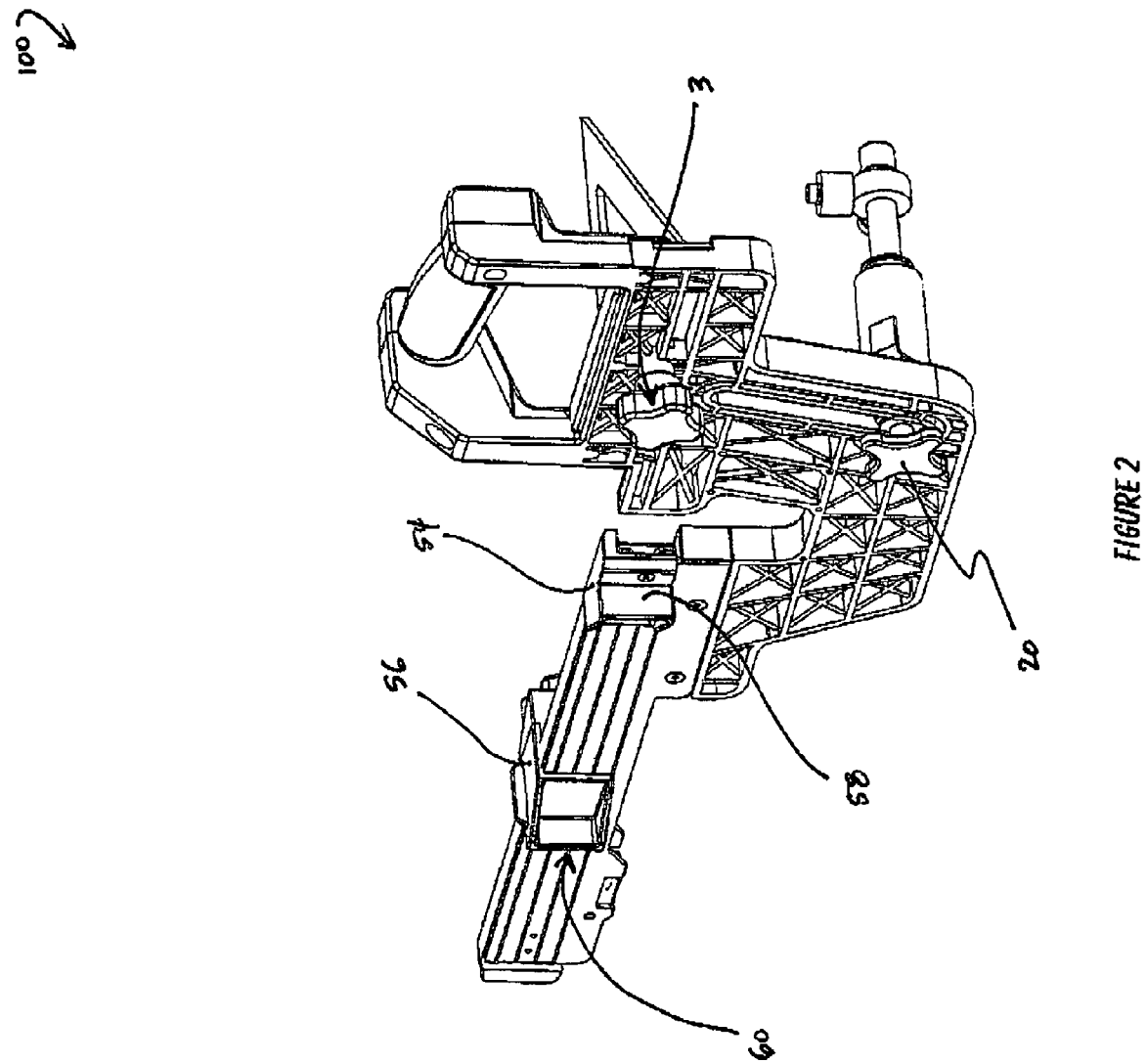
FIG. 2 is a rear perspective view of the attachment of FIG. 1.
Figure 3:
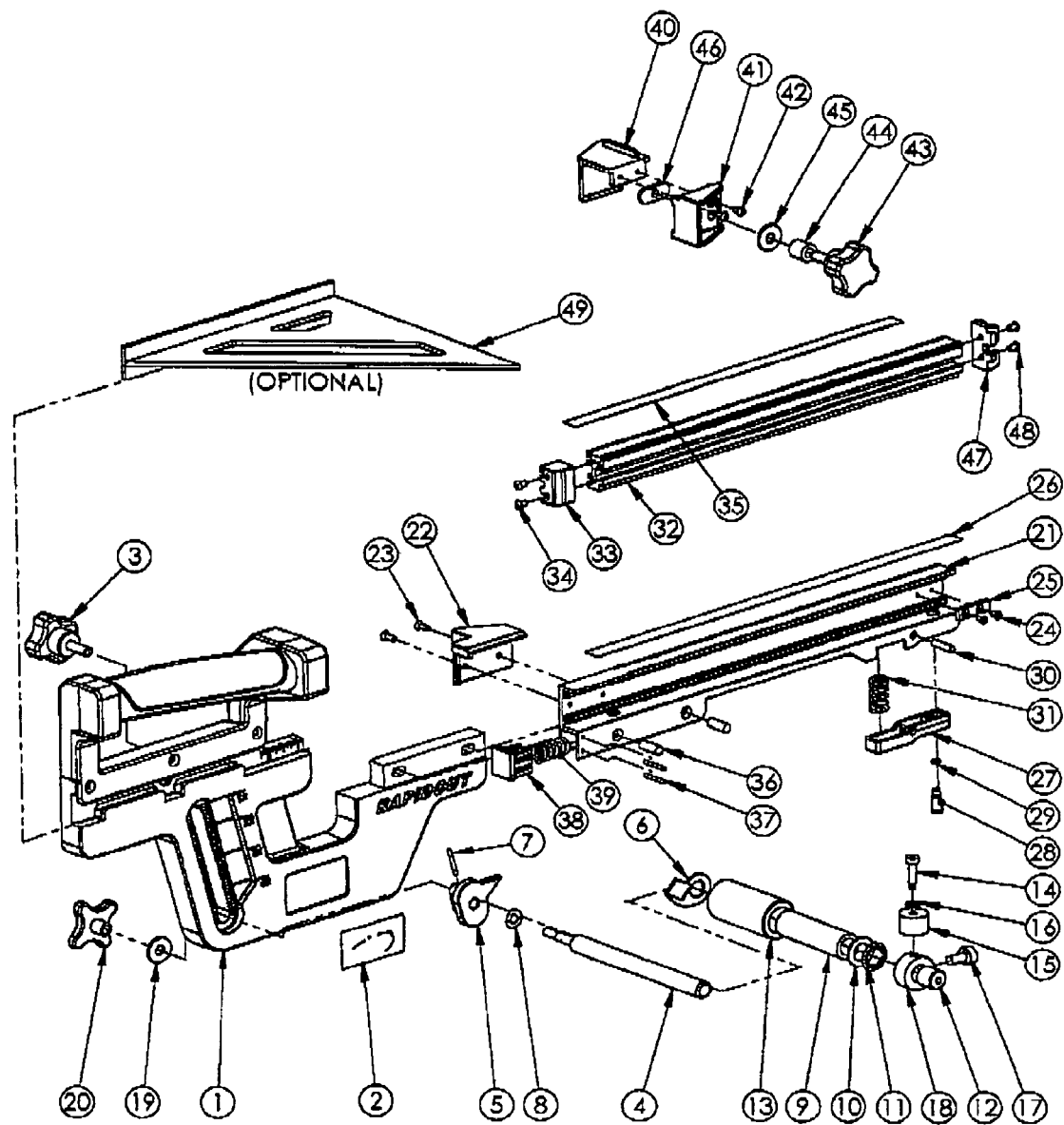
FIG. 3 is a front exploded perspective view of the attachment of FIGS. 1 and 2.

The second retaining channel 21 attaches to the main frame 1 through a spring-loaded attachment mechanism that can be seen clearly in FIG. 3 as well. The stop block 41 is slideable along a length of the second retaining channel 21 so that it can be positioned for the appropriate length of cut. The stop block clamp knob 43 can be tightened or loosened to position and then secure the stop block 41 at the desired position. If a cut is desired that is to result in a piece that is longer than can be provided by only the length of the second retaining channel 21, then the extension bar 32 can be extended out the necessary amount from the end of the second retaining channel 21. When the extension bar 32 is at the desired position, the latch lever 27 will hold the extension bar 32 in place. If we now turn to FIG. 2, we can examine another advantage of the present design.

FIG. 2 is a rear perspective view of the attachment 100 of FIG. 1. From the back side of the attachment 100 we can see the support roller knob 20 which is provided to allow the roller sleeve 13 to be secured once it is positioned along the support roller slot 52 in the desired location. Furthermore, there is a square clamp knob 3, which threadedly engages an aperture formed in the main frame 1. This will allow a user to secure the framing square 110 in its desired position.

One significant advancement of the cutout design is that it provides the user with the ability to cut a piece of wood to fit an existing bay between studs, joists or rafters. This is accomplished through operation of a pair of gauge faces extending from the back side of the attachment 100. The first gauge face 58 extends backwardly from the stationary gauge block 54 and the second gauge face 60 extends backwardly from the moveable gauge block 56. The user need simply position the first gauge face 58 against one side of the bay to be sized to cut to fit, and the moveable gauge block 56 which is integrated with the stop block 41 is then slid along the length of the second retaining channel 21 until the second gauge face 60 is against the stud or joist defining the other side of the (cut-to-fit) stud bay. Through the cooperative arrangement of the elements of the attachment 100, if the user then positions the end of the piece of wood at the stop block 41 and cuts as guided by the framing square 110, the wood block that results will be the length that is identical to the distance between the first gauge face 58 and the second gauge face 60. If we now turn to FIG. 3, we can examine all of the critical elements of this design.

FIG. 3 is a front exploded perspective view of the attachment 100 of FIGS. 1 and 2. Beginning with the main frame assembly 1, the support roller knob 20 threadedly engages the end of the support roller shaft 4, which extends through the supper roller slot 52 discussed in FIG. 1. The support shaft base member 5 includes an indicator pointer that is used to set the support roller shaft at the size of the different types (thicknesses) of dimensional lumber. A drag clip 6 is located at the base end of the support roller shaft and is provided to create additional resistance when the user desires to feed the wood into the attachment 100. In order to do so, it is a simple matter of tilting the attachment 100 so that the drag clip 6 pinches the piece of wood to be fed. The user can then pull the piece of wood longitudinally (for example, to the right in this view) by simply pulling the handle 129 to the right. When a sufficient length of wood has been fed, the user simply tilts up the attachment 100 until the drag clip 6 no longer pinches against the piece of wood, after which the attachment 100 can be slid easily to the left until the end of the piece of wood is in contact with the stop block 41. In this manner, the user can hold the handheld circular saw in their right hand and the attachment 100 in their left hand and repeatedly feed and cut, feed and cut an entire series of wood blocks without the need for repositioning of the attachment or the saw or the wood block through separate motion.

At the end of the support roller shaft 4, a collar 18 holds the roller sleeve 13 and bushing 9 securely on the shaft 4. Furthermore, the collar 13 has a threaded aperture formed in its periphery into which a side roller shaft 14 threadedly engages. The side roller shaft 14 retains a side roller sleeve 15, which is positioned to prevent the attachment 100 from inadvertently sliding off the side of the piece of wood during the cutting or feeding processes. The collar 18 is held on the support roller shaft by a thumb screw 17 which allows the user to tighten and loosen the collar in order to reposition the side roller sleeve 15 or to disassemble the roller sleeve assembly.

The second retaining channel 21 attaches to a pair of apertures 72 formed on the right side of the main frame assembly 1. A pair of pegs 36 are inserted through apertures formed in the second retaining channel 21 which then engage specialty apertures 72 formed in the main frame assembly 1. The apertures 72 are wider than they are high (i.e. they are oval in shape), such that a small amount of longitudinal travel can be permitted to prevent the saw from jamming while cutting. The spring 39 and block 38 create tension against one side of the apertures 72 for the pegs 36 to prevent the retaining channel 21 from rattling or feeling loose to the user. At the same time, if the saw blade begins to jam, the spring 39 and block 38 will permit the second retaining channel 21 to move (to the right in this view), thereby eliminating the blade pinch.

The stationary gauge block 22 attaches to the left or proximal end of the retaining channel 21. There is a first measuring scale 26 displayed on the top surface of the second retaining channel 21. The first measuring scale 26 provides the scale to which the stop block 41 is set to achieve the desired length of piece of wood after the cut.

The extension bar 32 is slideably accepted within the second retaining channel 21 in order to provide additional length when desired so that longer pieces of wood can be cut. A second measuring scale 35 is provided on the top surface of the extension bar 32. The mechanism that locks the extension bar 32 in place is the latch lever 27. The latch lever 27 is a fulcrum-like lever where in one end is biased downwardly by a spring 31, which forces the stop pin 28 upward and against the bottom of the extension bar 32. There may be depressions formed at regular intervals on the bottom of the extension bar 32 such that the tip of the stop pin 28 will actually lock the second measuring scale in place at predetermined graduations. In the current embodiment there are only depressions to lock the extension bar 32 in either the fully retracted or fully extended position. The stop pin 28 pressure upwardly against the extension bar 32 is sufficient to hold the extension bar 32 in any user-set extension condition.

The stop block assembly is designed to slide over and along the length of the second retaining channel 21. It comprises a stop block 41 on the front side of the second retaining channel 21 which is attached to a moveable gauge block 40 on the back side of the second retaining channel 21. The stop block clamp knob 43 is how the stop block 41 is positioned along the length of the second retaining channel, and then locked in place. If the extension bar 32 is extended, the stop block 41 can be slid along the extension bar 32, and beyond the end of the second retaining channel 21 to be set at a distance that is demarcated on the second measuring scale 35 for cutting longer pieces of wood. If we now turn to FIG. 4, we can examine the other aspects of this design.

Figure 4:
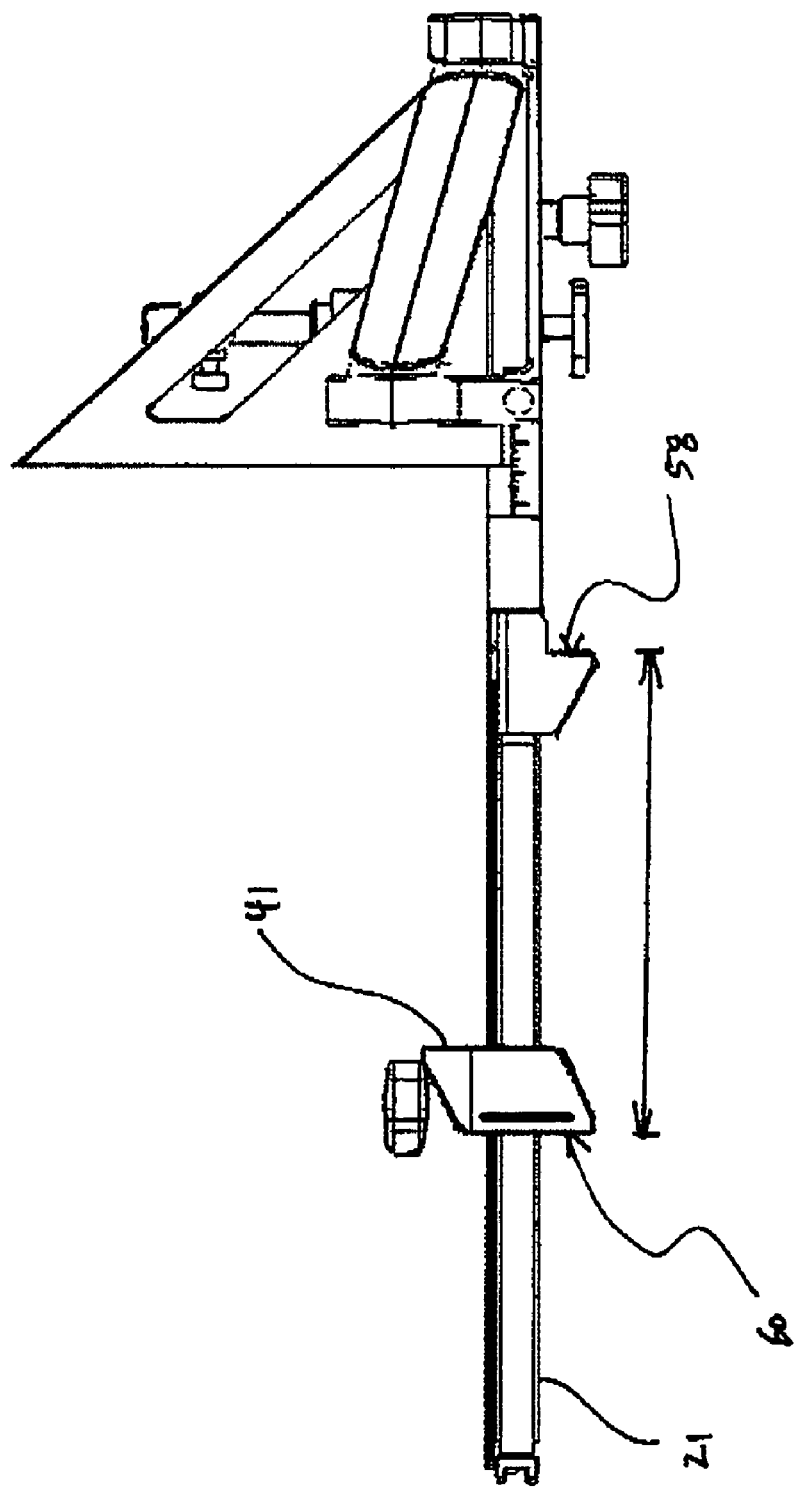
FIG. 4 is a top view of the attachment of FIGS. 1-3.

FIG. 4 is a top view of the attachment 100 of FIGS. 1-3. As shown here, the stop block 41 which is depicted on the left side of the drawing is positioned along the length of the second retaining channel 21 to create a distance between the first gauge face 58 and the second gauge face 60 that is the custom cut-to-fit length. As discussed above in connection with FIG. 2, this length can be set by the user such at the piece of wood can be cut to exactly match the custom cut-to-fit length. Now turning to FIG. 5 we can see the device from yet another view.

Figure 5:
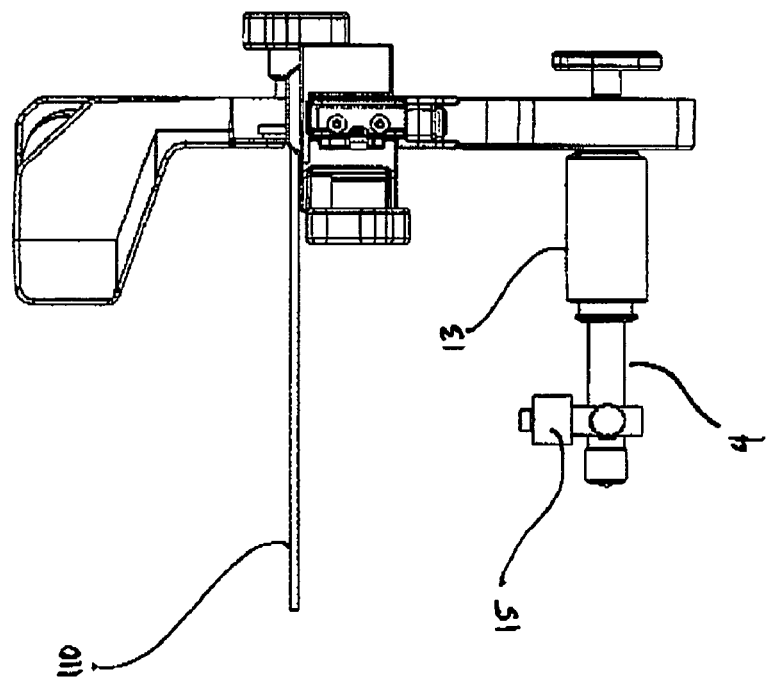
FIG. 5 is a right side view of the attachment of FIGS. 1-4.

FIG. 5 is a right side view of the attachment 100 of FIGS. 1-4. Here in FIG. 5 we see that the support shaft 4 supports the side roller sleeve 15 as well as the roller sleeve 13 to create a convenient support structure for feeding additional lumber through the attachment 100 while keeping it closely aligned underneath the U-shaped area to be cut.

Figure 6:
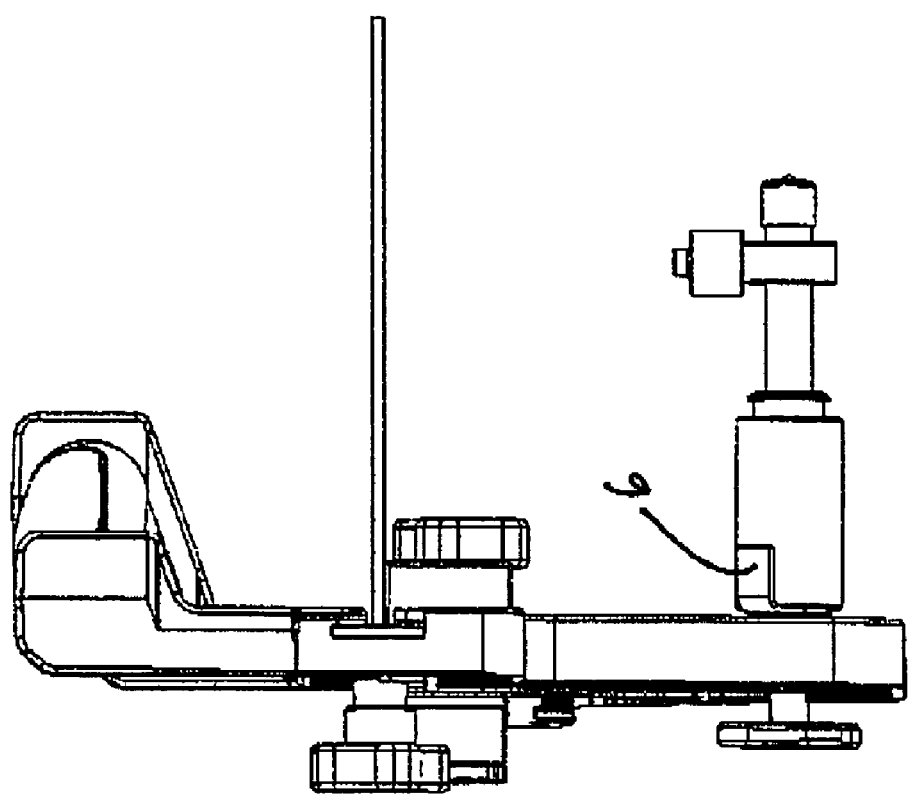
FIG. 6 is a left side view of the attachment of FIGS. 1-5.
Figure 7:
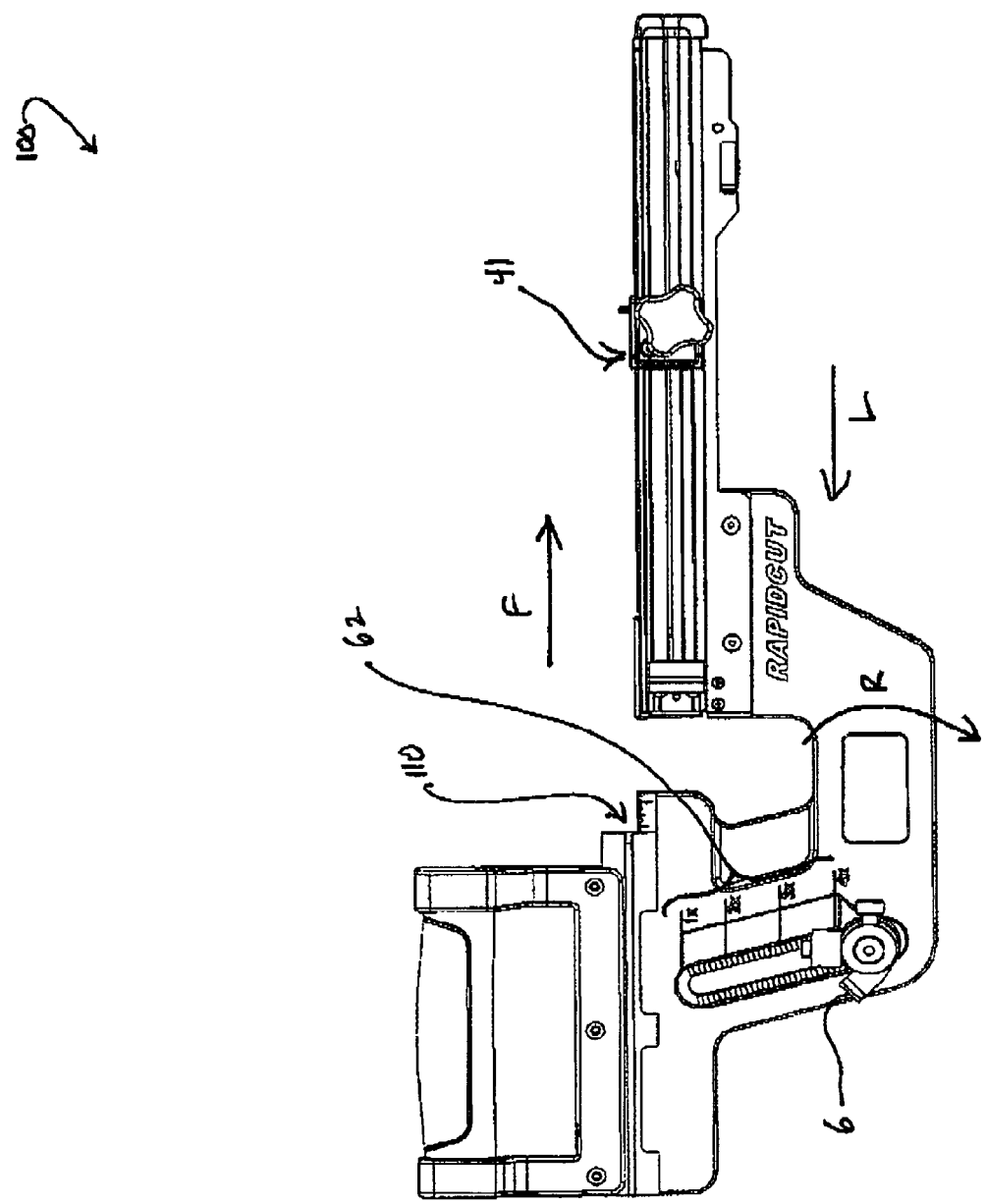
FIG. 7 is a front view of the attachment of FIGS. 1-6.

FIG. 6 is a left side view of the attachment 100 of FIGS. 1-5 and FIG. 7 is a front view of the attachment of FIGS. 1-6. FIGS. 6 and 7 show how the drag clip is positioned when the attachment 100 is in use. The drag clip 6 is normally slightly below and to the side of the top surface of the roller sleeve 13. If, however, the user rotates the device 100 in direction R the top surface of the drag clip 6 will reach above the top surface of the roller sleeve 13 which will create a pinching force on the lumber. This, then, will allow the user to feed the lumber ahead for the next cut by sliding the attachment 100 in direction F. Once the end of the lumber is sufficiently fed the attachment 100 is rotated counterclockwise until it is level and the device is moved in direction L until the end of the lumber is in contract with the stop block 41. At this point the circular saw fence can be placed against the framing square 110 and the out can be made.

Figure 8:
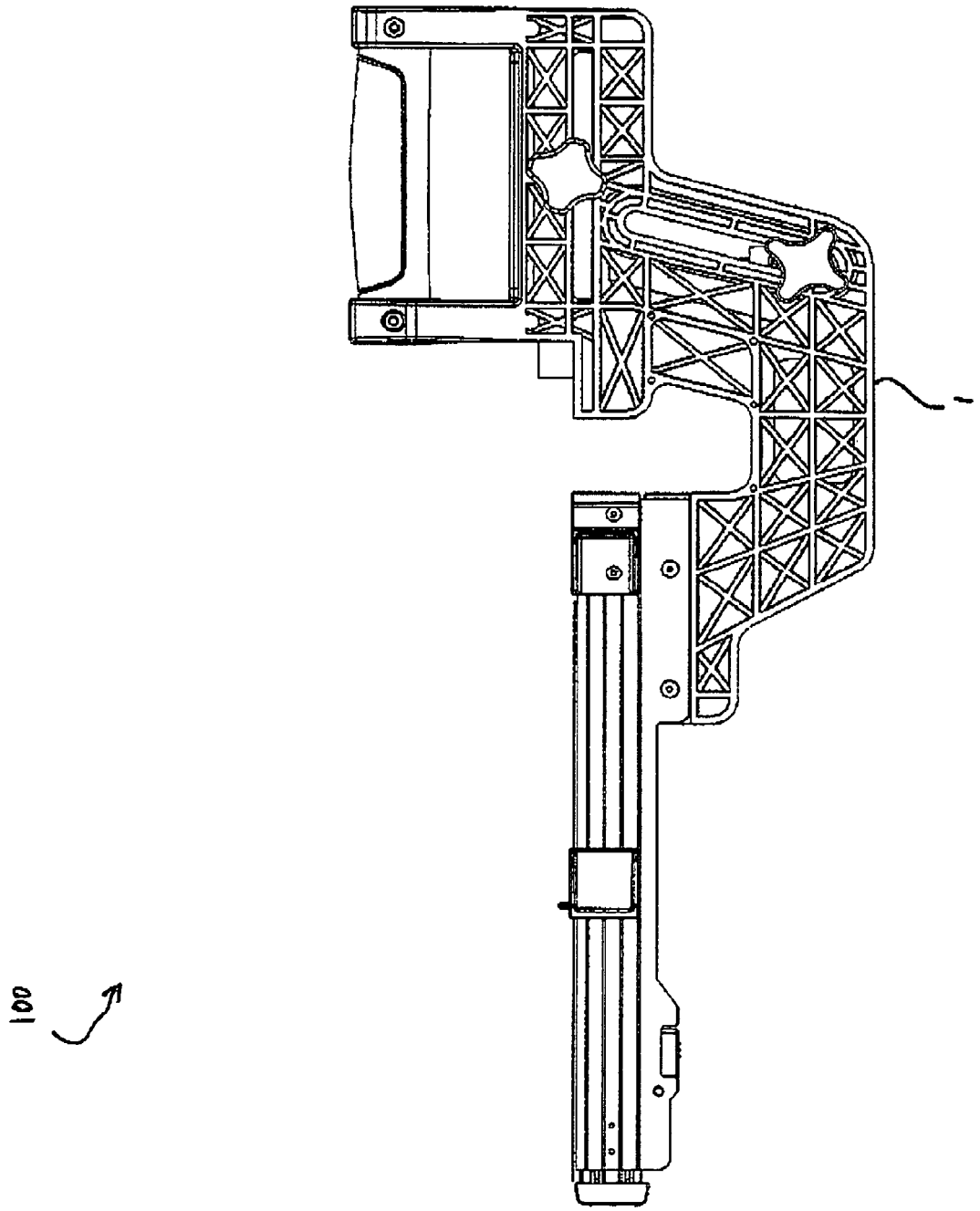
FIG. 8 is a back view of the attachment of FIGS. 1-7.
Figure 9:
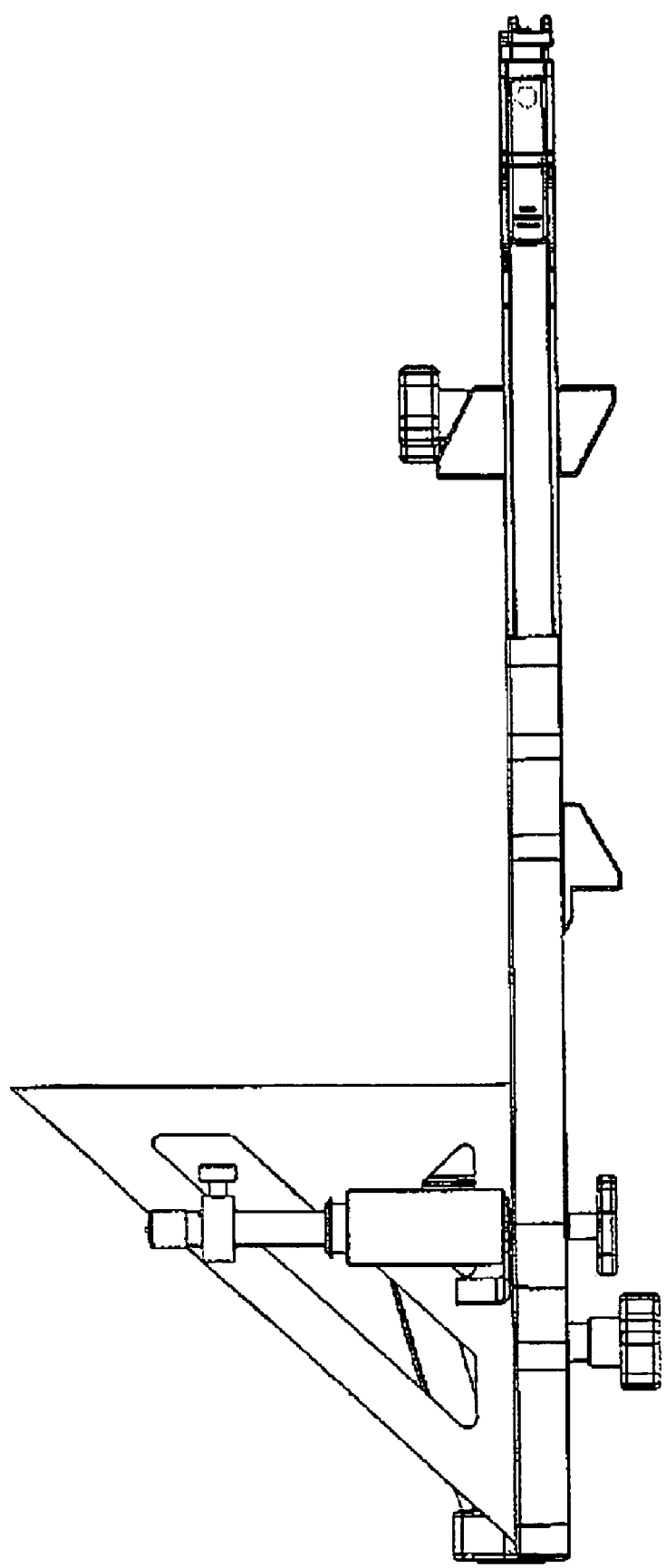
FIG. 9 is a bottom view of the attachment of FIGS. 1-8.

FIG. 8 is a back view of the attachment of FIGS. 1-7. This view of the attachment 100 to depict the mold details of the main frame 1. These details are provided simply to show an example of a preferred arrangement of structural fins.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

TABLE I

PARTS LISTING ITEM

| 1  | 3001 Main Frame Assembly EA |
| 2  | 3001-50 Nameplate EA |
| 3  | 3002 Knob, Square Clamp EA |
| 4  | 3005-010-01 Roller Support Shaft EA |
| 5  | 3005-010-02 Support Shaft Mount EA |
| 6  | 3005-010-03 Drag Clip EA |
| 7  | 3005-010-04 Roll Pin, 3/32 × 7/8 EA |
| 8  | 3005-010-05 Washer, 1/4" EA |
| 9  | 3005-020 Reducer Axle Bushing EA |
| 10 | 3005-040 Washer, 1/2" EA |
| 11 | 3005-042 1/2" Self Lock Retaining Ring EA |
| 12 | 3005-044 1/2" Vinyl Cap EA |
| 13 | 3005-050-01 Roller-2" EA |
| 14 | 3005-090 Shoulder Bolt EA |
| 15 | 3005-100 Side Roller EA |
| 16 | 3005-110 Washer, #10 EA |
| 17 | 3005-120 1/4-20 Thumb Screw EA |
| 18 | 3005-130 Collar Mount EA |
| 19 | 3006 Washer, 1/4" EA |
| 20 | 3007 Knob, Support Shaft EA |
| 21 | 3009-010 Channel EA |
| 22 | 3009-020 Wearplate Cap EA |
| 23 | 3009-030 Screw, Wearplate, #6-32 EA |
| 24 | 3009-050 Screw, Stop Plate, #4-40 EA |
| 25 | 3009-040 Extension Bar Stop Plate EA |
| 26 | 3009-060 Channel Scale EA |
| 27 | 3009-070-01 Latch Lever EA |
| 28 | 3009-070-02 Stop Pin EA |
| 29 | 3009-070-03 Retaining Ring EA |

TABLE I-continued

PARTS LISTING ITEM

| 30 | 3009-080 Pivot Pin EA |
| 31 | 3009-090 Latch Spring EA |
| 32 | 3011-010 Extension Bar EA |
| 33 | 3011-020 End Block EA |
| 34 | 3011-030 Screw, End Block, #6-20 EA |
| 35 | 3011-040 Extension Bar Scale EA |
| 36 | 3014 Overload Shaft EA |
| 37 | 3018 Pin, Retainer Block EA |
| 38 | 3016 Spring Retainer Block EA |
| 39 | 3017 Overload Spring EA |
| 40 | 3019-010-02 Gauge Plate EA |
| 41 | 3019-010-01 Stop Block EA |
| 42 | 3019-010-03 Screw, Stop Block, #6-19 EA |
| 43 | 3020 Knob, Stop Block EA |
| 44 | 3025 Knob Spacer EA |
| 46 | 3030 Clamp Plate EA |
| 47 | 3040 End Cap, Extension Bar EA |
| 48 | 3050 Screw, End Cap, #6-20 EA |
| 49 | 3060 6" Rafter Square (Optional) EA |

What is claimed is:

1. An attachment for a framing rafter square, the square defined by a triangular base and a flange, the base further defined by a fence edge, the attachment comprising:
    a frame member defined by a first retaining channel for accepting said framing rafter square flange therein, said channel defining an axis,
    said frame member further defined by a roller slot extending along a slot axis;
    a roller shaft extending along a roller shaft axis, the shaft defined by a backside end opposing a frontside end, said shaft extending through said roller slot, said roller shaft secured in position along said support roller slot by a support roller knob engaging said backside end of said roller shaft protruding through said roller slot; and
    an extension member extendable from said frame member substantially parallel to said axis, said frame member further comprises a U-shaped segment member defined by a first end and a second end, and said frame member further comprising said first retaining channel extending from said first end, said second retaining channel configured to accept said extension member therein.

2. The attachment of claim 1, further comprising a roller sleeve surrounding said roller shaft, said roller sleeve cooperatively sized such that said roller sleeve slidingly engages said roller shaft.

3. The attachment of claim 2, further comprising a bushing sleeve between said roller shaft and said roller sleeve.

4. The attachment of claim 3, further comprising a side roller shaft extending from a location proximate to said frontside end of said roller shaft, said side roller shaft defining a side roller axis.

5. The attachment of claim 4, further comprising a side roller sleeve surrounding said side roller shaft, said side roller sleeve cooperatively sized such that said roller sleeve slidingly engages said roller shaft.

6. The attachment of claim 5, further comprising a drag clip attached to said roller shaft in close proximity to said frame member.

7. The attachment of claim 6, wherein said drag clip is defined by a base section, said base section defined by an aperture formed therethrough for accepting said roller shaft therethrough, said drag clip further defined by a tab extending from said base section, said tab being noncoplanar with said base section.

8. The attachment of claim 7, wherein said extension member is defined by an extension bar slidingly engaging said second retaining channel, said frame member defined by a front face wherein said second retaining channel is disposed and a back face, said extension member further having a stop block slidingly engaging said extension member.

9. The attachment of claim 8, further defined by a movable gauge block attached to said stop block, whereby said movable gauge block protrudes from said back face and said stop block protrudes from said front face.

10. The attachment of claim 9, further defined by a stationary gauge block attached to said frame adjacent to said U-shaped segment.

11. The attachment of claim 10, further defined by a latching mechanism actuated by a latch lever, said latching mechanism disposed on said frame member such that said mechanism can engage said extension bar.

12. A framing rafter square attachment, comprising:
a frame member defined by a first retaining channel for accepting a framing rafter square, and a second retaining channel;
a roller shaft extending from said frame member in a direction that is generally perpendicular to the direction that said second retaining channel extends; and
an extension member extendable from said second retaining channel, substantially parallel to said second retaining channel said frame member further comprises a U-shaped segment member defined by a first end and a second end, and wherein said first retaining channel extends from said first end, and said second retaining channel extends from said second end.

13. The attachment of claim 12, wherein said extension member is defined by an extension bar slidingly engaging said second retaining channel, said frame member defined by a front face wherein said second retaining channel is disposed and a back face, said extension member further having a stop block slidingly engaging said extension member.

14. The attachment of claim 13, further defined by a movable gauge block attached to said stop block, whereby said movable gauge block protrudes from said back face and said stop block protrudes from said front face.

15. The attachment of claim 14, further defined by a stationary gauge block attached to said frame adjacent to said U-shaped segment.

16. The attachment of claim 15, further comprising a roller sleeve surrounding said roller shaft, said roller sleeve cooperatively sized such that said roller sleeve slidingly engages said roller shaft.

17. The attachment of claim 16, further comprising a side roller shaft extending from a location proximate to said frontside end of said roller shaft, said side roller shaft defining a side roller axis.

18. The attachment of claim 17, further comprising a drag clip attached to said roller shaft in close proximity to said frame member.

19. The attachment of claim 18, wherein said drag clip is defined by a base section, said base section defined by an aperture formed therethrough for accepting said roller shaft therethrough, said drag clip further defined by a tab extending from said base section, said tab being noncoplanar with said base section.

20. The attachment of claim 19, further comprising a bushing sleeve between said roller shaft and said roller sleeve.

\* \* \* \* \*